Dec. 24, 1957 F. K. LOW 2,817,710
MULTIPARTY TELEPHONE SYSTEM
Filed July 14, 1954
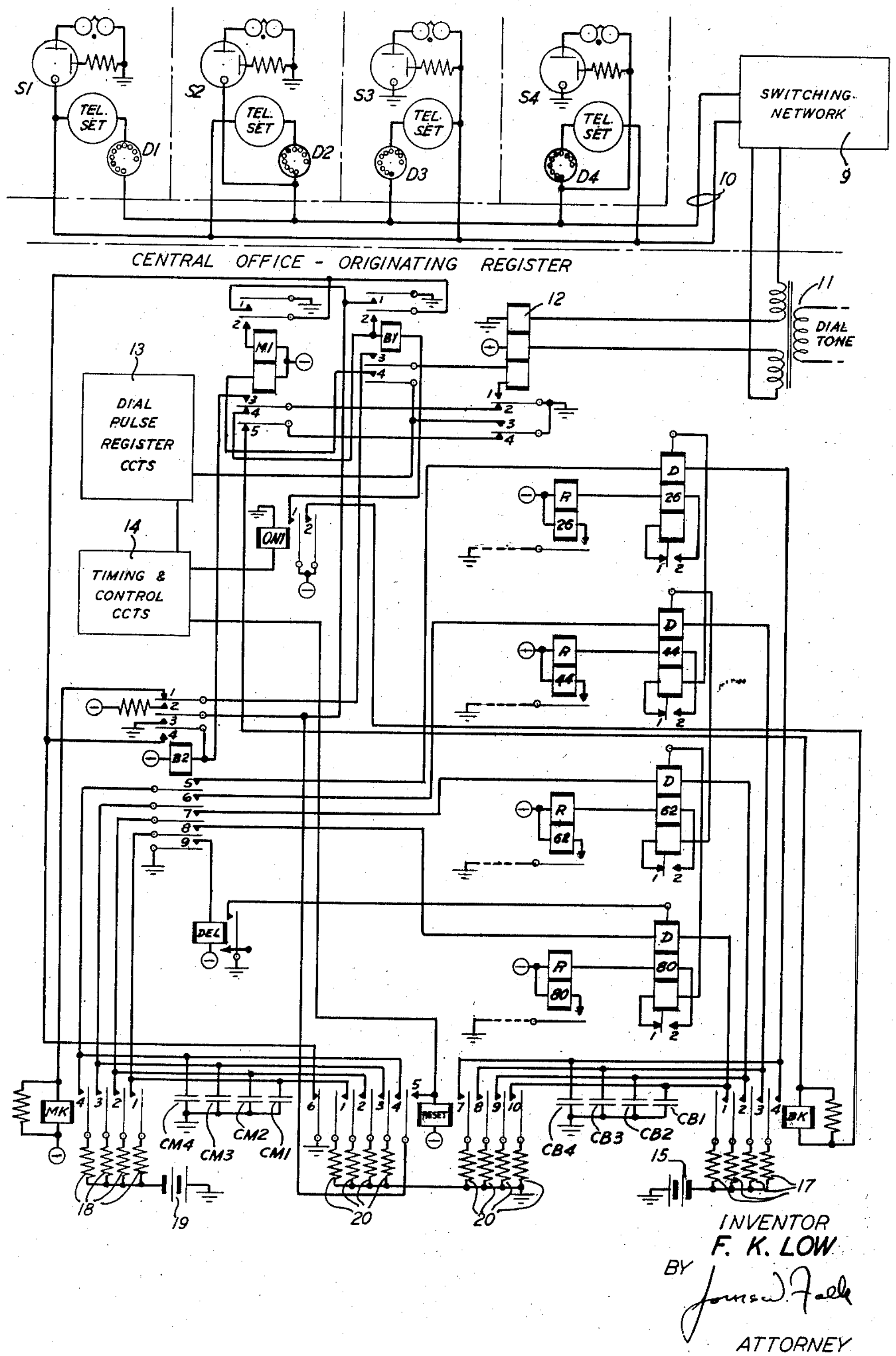
INVENTOR
F. K. LOW
BY [signature]
ATTORNEY 2,817,710
Patented Dec. 24, 1957

2,817,710

MULTIPARTY TELEPHONE SYSTEM

Frank K. Low, Orange, N. J., assignor to Bell Telephone Laboratories, Incorporated, New York, N. Y., a corporation of New York Application July 14, 1954, Serial No. 443,225

14 Claims. (Cl. 179—8.5)

This invention relates to telephone systems and more particularly to the identification of calling stations or subscribers on a multiparty line.

It is common in telephone systems to utilize a single telephone line into a central office for a number of subscribers who may share the line on a common or party line basis. Central office switching equipment can readily set up a connection in response to dial pulses appearing on the party line without regard to the individual subscriber on the line who is initiating the call. However, for accounting and charging purposes it is necessary to identify the particular subscriber station at which the call was placed.

Heretofore if two subscriber stations were connected to a party line, identification has been accomplished by providing a ground at only one of the stations and making a ground test at the central office to determine whether that ground is present at the calling station. However, on multiparty lines in excess of two, this is not feasible and the usual procedure has been for a party line subscriber to be connected to an operator who asks the subscriber to identify himself. Such a procedure is undesirable in automatic telephone systems.

It has been heretofore proposed that party line telephones be arranged to produce extra dial pulses which are transmitted to identify the calling party or that they be equipped with tone generators, such as reeds, which may be activated to transmit tones of different frequencies at a particular point during dialing, each subscriber being assigned a distinctive frequency. Identification of party line subscribers by multifrequency testing originating at the central office has also been proposed.

Embodying these prior proposals in existing systems has, however, necessitated the installation of additional equipment, and in some instances has limited identification of the calling subscriber station to the period subsequent to completion of dialing.

Objects of this invention, therefore, are to provide positive and reliable identification of calling subscribers on a party line without the addition of equipment at the party stations, to effect identification during the dialing of the digit pulses, and otherwise to improve multiparty telephone systems.

In accordance with one feature of this invention, identification of the calling station is accomplished coincident with the subscriber's dialing, thereby eliminating the identification interval from the total time required to extend switching connections. In a telephone system according to this invention, no special equipment is needed at the party line subscribers' stations other than that required for originating a call, nor is any additional action required on the part of the subscriber.

In telephone systems in accordance with one embodiment of this invention, the dial which is provided at each subscribers' station is constructed to exhibit pulse transmitting characteristics different in the make-to-break ratio from each of the other stations connected to the same line. According to conventional telephone practice, pulses are generated on telephone lines by the dial mechanism which comprises an integral part of each subscriber station. Each such mechanism includes a pair of contacts which interrupt the flow of current from a source of potential over the line loop. In a train of pulses these contacts will be alternately opened and closed to prevent and permit the flow of such current. The relation between current flow and current interruption intervals is defined as the make-to-break ratio.

In one specific illustrative embodiment of this invention wherein four subscriber stations are connected to a single party line, one dial is adjusted to prevent the flow of pulse current for 26 percent of the cyclical pulse period, the second dial to prevent pulse current flow for 44 percent of the cycle, the third to prevent pulse current flow for 62 percent of the cycle, and the fourth to prevent pulse current flow for 80 percent of the cycle.

In accordance with another aspect of this invention, the identification of the calling station is effected at the central office by differentiating or distinguishing between the characteristics of the dial pulses emanating from the various stations on the line. In one specific illustrative embodiment of this invention, distinction between the aforementioned pulse characteristics is recognized by two sets of timing networks each including a condenser and a resistance representative of each subscriber station on the common line. During each break portion of the pulse cycle, the first or "break" condensers are charged; during the make portion of the pulse cycle, when the dial contacts are closed, the second or make condensers are charged. After the time cycle for one pulse, as determined by the commencement of the break portion of the next pulse cycle, the condensers for each subscriber are connected in series opposition with a polar relay winding interposed between them. In accordance with an aspect of this invention, transient condenser current flowing through the polar relay will activate the windings only if the charge voltage built up on one set of condensers is larger than the charge voltage built up on the other set of condensers; specifically, in this one illustrative embodiment of this invention, only if the charge voltage on the break timing condensers is larger than the charge voltage on the make timing condensers.

Each condenser-resistance combination of the timing networks has a distinctive time constant such that the break timing condenser is always charged more negative than the make timing condenser for a particular make-to-break ratio. It should be borne in mind that the current through the polar relay on connection of these condensers is a transient current due to a difference in charge voltage on the condensers. This transient current is, however, sufficient to operate the contacts of the polar relays. The polar relays are locked up by a circuit completed through contacts of a delay relay which operates when the condensers are connected together. This current from the delay relay contacts is applied in sequence to each of the polar relays, starting with the relay associated with the subscriber having the highest percentage break period or lowest make-to-break ratio. When it finds a polar relay operated by the transient current it locks it in its operated position; if a polar relay is not in its operated condition due to the transient current, the current is applied to the next polar relay. In this way, in this specific embodiment, even though all polar relays operable on occurrence of a larger make-to-break ratio than actually occurred are operated by the transient condenser current, only that relay associated with the actual make-to-break ratio that occurred is locked up.

Concurrent with the identification process, the dial pulses are repeated into the regular dial pulse register where, in accordance with established methods, they control apparatus which establishes the connection desired by the calling party.

It is a feature of this invention that each individual station on a multiparty line is provided with a telephone set having a dial mechanism constructed to transmit dial pulses distinctive to that station.

More specifically the dial pulses transmitted by each individual station are different from those transmitted by each of the other stations in the make-to-break ratio of the pulses.

It is another feature of this invention that the identification of the calling station by the detection equipment is accomplished in response to the time intervals associated with the make-to-break ratios of the dial pulses.

It is yet another feature of this invention that timing condensers and associated polarized detector relays are used to identify the calling station, the magnitude of timing condenser charge voltage being controlled by the different make-to-break ratios of the pulses transmitted from the individual stations.

It is a further feature of this invention that the polar relays are operated on the transient currents resulting from connection of the timing condensers in series opposition, current for locking the polar relays in their operated positions being supplied to each of such relays in sequence, beginning with the relay associated with the dial having the lowest make-to-break ratio in order that, even though a number of the polar relays may be operated by the transient currents from the condensers, only the relay associated with the dial whose make-to-break ratio has been timed will be locked up.

A complete understanding of this invention and of these and other features thereof may be gained from consideration of the following detailed description and the accompanying drawing, the single figure of which depicts one specific illustrative embodiment of this invention wherein a party line includes four subscriber stations connected by the single line to a central office.

The subscribers' stations may be of well known types, each including a telephone set, a dial and a ringer circuit. The dial for each station is a familiar construction and may be similar to that disclosed in Patent 2,563,581, granted August 5, 1951, to H. R. Clarke, L. A. Elmer, A. Herckmans, and O. L. Walter. Such dials are constructed to transmit dial pulses at a desired pulse rate, the pulses possessing a desired "percent break." The term "percent break" is defined to be one hundred times the ratio of the duration of the interval during which the pulse contacts of the dial are open to the duration of a complete pulse cycle which comprises one of such contact open intervals plus one interval during which the pulse contacts are closed.

In accordance with one aspect of this invention the dial mechanisms at each of the stations are differently adjusted or constructed in the design of the face of the cam controlling the opening and closing of the dial contacts so that the pulses generated by each station will have a different "percent break" from that of every other station on the line this "percent break" may be thus maintained.

The drawing shows subscribers' stations S1, S2, S3 and S4 connected to party line 10 which is terminated at a central office represented by part of an originating register. This central office is the terminus for many subscribers' lines including party lines similar to line 10 and may comprise a switching network of the crossbar type disclosed in Patent 2,585,904, issued to A. J. Busch, February 19, 1952.

When a party initiates a call by removing the handset at his station, line 10 is connected by the switching network 9 to an originating register circuit for multiparty line dialing; the fact that line 10 is a multiparty line is recognized by circuitry in the switching network which may also be of the crossbar type disclosed in the above-mentioned Busch patent. Relay 12 is connected by its contacts to the dial pulse register circuits 13 and repeats dial pulses from line 10 to the dial pulse register circuit, where they are registered and utilized for establishing the connection through the central office, as is known in the art. The line relay 12 is characterized by its ability to respond to and repeat dial pulses under impedance conditions normally associated with multiparty lines.

After the crossbar originating register is seized by the switching network, the reset relay reset is operated for a short interval by timing and control circuit 14. Operation of the reset relay provides discharge paths for the break and make timing condensers CB1—CB4 and CM1—CM4 which are utilized as hereinbefore stated for the timing of the percent break or make-to-break ratio of the dial pulses to identify the calling subscriber on the party line. Discharge of these condensers insures that the condensers will commence the identification process with a zero charge, this being especially important since the charge voltage built upon each condenser in a given time interval is used as the basic means of distinguishing between the different pulses emanating from the various subscriber stations on the line. Timing and control circuit 14 advantageously includes a number of relays operable in succession, as known in the art and described in the above-mentioned Busch patent for the timing of various operations in the central office. Relay reset releases after the condensers are discharged.

With the commencement of dialing and the consequent interruption of the current, relay 12 is released. Release of relay 12 in combination with the application of the off-normal battery by relay ON1, which has also been operated by the timing and control circuits 14, operates relay BK through a circuit which may be traced from ground through contact 4 of relay 12, contact 5 of relay M1, the winding of relay BK, the contact 2 of relay ON1 and thence to battery. Relay BK in operating applies a negative potential to one plate of each of condensers CB1—CB4 from a source 15 through resistors 17 and contacts 1—4 of relay BK, the other plate of each of condensers CB1—CB4 being grounded. Release of relay 12 also establishes a circuit for operating relay B1, which comprises ground, contact 2 of relay 12, contact 4 of relay M1, the winding of relay B1, contact 1 of relay ON1 and battery. Relay B1 locks operated through a circuit from ground via contact 6 of the reset relay, contact 2 of relay B1, the winding of relay B1, contact 1 of relay ON1 and battery.

During the time that the relay 12 is thus released, which is the period of the break phase of the dial pulse cycle, the condensers CB1, CB2, CB3 and CB4 are being charged through resistances 17; the total charge voltage built up on these condensers during that time being dependent upon the condenser resistor time constants, hereinafter explained, and the length of the break phase of the dial pulse cycle.

When the dial pulse break phase is completed and the make phase is begun, the loop over line 10 is again closed, thereby reoperating relay 12. Relay 12, in operating initiates the following operations: It releases relay BK by interrupting the path leading thereto from ground over relay 12 No. 4 contacts, thereby disconnecting battery 15 from the condensers CB1—CB4. Relay MK, associated with the make timing network, is now operated through a circuit from ground via contact 1 of relay 12, the lowermost winding of relay 12, contact 3 of relay B1, contact 1 of relay B2, the winding of relay MK and then to battery.

In operating, relay MK completes paths from condensers CM1—CM4 via its Nos. 1–4 contacts and resistors 18 to a source of charging potential 19. Relay 12 in operating, also completes a circuit for the operation of relay M1. This circuit may be traced from ground through contact 3 of relay 12, contact 4 of relay B1, and the lower winding of relay M1 to battery. Relay M1 locks operated in a circuit comprising ground, contact 6 of the reset relay, contact 2 of relay M1, the winding of relay M1 and battery.

Relay 12 is now released by the second break pulse generated by the dial, thus marking the end of the first complete dial pulse cycle. The release of relay 12 cause the release of relay MK and thus terminates the charging of timing capacitors CM1—CM4. The charge voltages stored in the CB1—CB4 and CM1—CM4 condensers are all negative with respect to ground but differ in magnitude according to a function of the time constant of each combination of capacitor and associated resistor and the duration of the charging-time-interval. Relay 12, in releasing, completes a path from ground through contact 2 of relay 12, through contact 3 of relay M1 and through the winding of relay B2 to battery. Relay B2 locks operated in a circuit comprising contact 6 of the reset relay, contact 4 of relay B2, and the winding of relay B2 to battery.

Relay B2, in operating, activates circuitry that identifies the calling subscriber according to the distinctive charge voltages built up on the timing condensers CB1 to CB4 and CM1 to CM4.

In the instant embodiment of this invention which is herein set forth by way of example, subscriber dial pulse break percentages have been arbitrarily selected as follows: 26 percent, 44 percent, 62 percent and 80 percent break, respectively. It will be obvious to one skilled in the art that other percentages could be chosen without departing from the spirit or scope of this invention.

Magnitudes of resistors 17 and 18, together with magnitudes of capacitors CB1—CB4 and CM1—CM4, will be influenced somewhat by the selection of the break percentages as hereinbefore set forth. The reason for this is that "nulls" for each pair of time-comparing resistance-capacitance groups should occur at some point between successive break percentages. For example, the time constant of resistor 17 and capacitor CB1 should be such that capacitor CB1 will be charged to a predetermined voltage when the interval during which it is charged corresponds to a break percentage lying between 80 percent and 62 percent. The time constant of resistor 18 and capacitor CM1 should correspondingly be such that capacitor CM1 will be charged to an identical voltage during the corresponding make interval. The percentage break at which capacitor CB1 will be charged to the same voltage as capacitor CM1 is said to be a "null" and should correspondingly occur for capacitor pairs CB2 and CM2, and CB3 and CM3, at percentages lying between 62 and 44 percent and 44 and 26 percent, respectively. Null for capacitors CB4 and CM4 may be advantageously located at some percentage break less than 26 percent.

In the instant embodiment the aforementioned nulls have been positioned midway between the adjacent dial pulse break percentages, and therefore occur at 71 percent, 53 percent, 35 percent and 17 percent, respectively. Other values lying between the pulse break percentages chosen will, however, fall within the principles of this invention.

As is well known in the art, every serially connected resistor-capacitor pair is characterized by a time constant which may be said to be the product of the resistance and capacitance thereof. This time constant is, in a sense, a measure of the rapidity with which such capacitor may be charged, a large time constant denoting a long charging time. Because such constant is the product of resistance and capacitance, it will be obvious that a given constant may be the product of an infinite number of different combinations thereof. It will also be apparent that one resistor-capacitor pair may be chosen to be chargeable to a given voltage in, say, 17 percent of a given period of time, and that another pair may be chosen to be chargeable to the same voltage in the remaining time say 83 percent of such period. In order to satisfy these conditions, it will be necessary that the time constants of the two pairs by different, thereby necessitating difference in the resistors or capacitors, or resistors and capacitors, which comprise the two pairs.

As hereinbefore stated, if for example the dial pulse break percentages are chosen to be 26, 44, 62 and 80, and if the nulls are advantageously chosen to fall at 17, 35, 53 and 71 percent, respectively, then the parameters may be readily chosen according to the following principles: The elapsed charging time divided by the product of resistance and capacitance should be a constant for the two timing RC networks which are to be compared. For example, the percentages of time required for charging capacitors CB4 and CM4 to their null potentials will be 17 percent and 83 percent, respectively. Therefore, $$\frac{.17t}{(\mathrm{CB4})(\text{resistor } 17)} = \frac{.83t}{(\mathrm{CM4})(\text{resistor } 18)}$$

where "$t$" equals the make plus break time, CB4 and CM4 are capacitances, respectively, of the designated capacitors and resistor 17 and resistor 18 are resistances, respectively, of the associated resistors.

The magnitudes of the capacitors should be sufficient to provide flow of relay operating current therebetween after having been charged during actual break and make intervals. Once the capacitors are chosen, the hereinbefore stated expression may be used to determine suitable values for the associated resistors.

In one operative embodiment of the invention, magnitudes of resistance and capacitance were chosen according to the principles set forth above, and were as follows:

| Capacitor No. | Capacitance, microfarads | Associated Resistance, ohms |
|---|---|---|
| CB1 | 4.32 | 16,460 |
| CB2 | 4.32 | 12,280 |
| CB3 | 4.32 | 8,110 |
| CB4 | 4.32 | 3,940 |
| CM1 | 4.32 | 6,720 |
| CM2 | 4.32 | 10,890 |
| CM3 | 4.32 | 15,050 |
| CM4 | 4.32 | 19,200 |

These values are set forth for example only since, as stated above, an infinite number of different combinations of resistances and capacitances could be substituted therefor.

As described above, identification is made in this specific embodiment by connecting the respective capacitors in series opposition and operating polar relays on the transient currents due to the difference in charge voltages on the condensers. After a delay, current is applied to the polar relays to lock up which polar relay that has been operated by the transient current corresponding to the longest break period of the pulse cycle; i. e., if the break portion had been 62 percent of the pulse cycle, the polar relays for the 62 percent and lesser break ratios, such as 44 percent and 26 percent, would all be operated by the transient condenser current. However, in accordance with this aspect of the invention, only the polar relay for the 62 percent break period would be locked up, and the other relays would be released on cessation of the transient current.

Specifically, such identification procedure is initiated by operation of relay B2, of which contacts 9 complete a path from ground to the winding of a delay relay DEL, thereby actuating the delay relay DEL, and also, by closing its contacts 5, 6, 7, and 8 to complete paths connecting the CM and CB timing condensers in series opposition through the operating windings of four polar detection relays identified on the drawing as D26, D44, D62, and D80. These symbols designate the minimum percent break period for which each is operated by the transient condenser current.

The interconnection by relay B2 of capacitors CB1—CB4 with CM1—CM4 through the windings of the four detection relays D26, D44, D66, and D80 will cause transient currents to flow through the windings of these relays. By detecting the direction of the flow of current through these relays, they being of the polar type, the calling station that generated the condenser charging pulses will be identified. If the dial of calling station 4 is assumed to generate pulses having the 26 percent break characteristic, then the negative charge voltage on timing condenser CB4 will be greater than the negative charge voltage on timing condenser CM4 due to the difference in time for charging each, charging time being proportional to the percent break of the pulse and the percent make of the pulse, respectively, and due also to the resistor and condenser values involved. With a greater negative charge voltage on condenser CB4, current will flow from condenser CM4 through contact 5 of relay B2, and the upper winding of relay D26 to condenser CB4. Current flowing in this direction through the winding of relay D26 will operate relay D26 by moving the armature from the No. 1 contact to the No. 2 contact. At this same time, due to the different time constants and the duration of the charging period, which was determined by the percent break or make periods, timing condensers CB1, CB2, and CB3 all receive a less negative charge voltage than the corresponding timing condensers CM1, CM2, and CM3, and as a consequence the flow of current is in the opposite direction through relays D44, D62, and D80; these other detection relays therefore do not operate and their armatures remain at their No. 1 contacts. The delay relay DEL operates after having allowed sufficient time to permit the detection relays D26, D44, D66, D80 to respond to the direction of transient current flow therethrough. The delay relay DEL, in operating, applies locking ground through a chain circuit to one of the register relays R associated with the detection relays D. The path for the locking ground may be traced from the operated contact of the delay relay DEL through contact 1 and the lower winding of relay D80, through contact 1 and the lower winding of relay D62, through contact 1 and the lower winding of relay D44, through contact 2 and the middle winding of relay D26, and through the upper winding of register relay R26 to battery thus operating relay R26. Relay R26, upon operation, locks itself operated. The identification of the calling station is now registered in the register R26 relay.

The remaining subscriber telephone dials will, when activated, operate other relays or combinations thereof which will make identification in a manner analogous to that hereinbefore described. If the calling station has a 44 percent break value, then the current resulting from the connection of the capacitors as described above will flow from capacitor CM3 to capacitor CB3 and operate detection relay D44. Detection relay D26 will also operate, but the register relay R26 will not operate since operation of detection relay D44 on the transient condenser current causes the armature of relay D44 to move from its contact 1 to contact 2. The ground from the delay relay is thus applied to the register relay R44 and not through the operated detection relay D26 to register relay R26. Accordingly, after cessation of the transient current, relay D26 will be released and the only identification registered in the register relays R will be that distinctive to the subscriber station characterized by a 44 percent break period of its dial.

If station No. 2, i. e., the 62 percent break station, initiates a call, current will flow from timing capacitor CM2 to capacitor CB2 when connected by relay B2 and detection relay D62, and register relay R62 will be operated, as described above. D44 and D26 will also operate but cannot extend ground to register relays R44 and R26, due to operation of relay D62, as described above. The 80 percent break station is identified by operation of detection relay D80 and register relay R80 in a manner similar to that described for the other identifying relays.

Upon completion of dialing, which is recognized by the timing and control circuits 14 in the manner known in the art, the reset relay is operated and the timing condensers CB1—CB4 and CM1—CM4 are discharged fully through resistances 20. The reset relay RESET, in operating, also resets the various other relays. This circuit may then be utilized in the identification of a subscriber on other party lines connected to the central office. Reset is effected by opening of the ground contact 6 of the reset relay RESET.

It is apparent that the initial detection is made during the first dial pulse and may be checked as often as the dialed number permits where that number contains digits greater than 1 or where more than one digit is dialed. Further, while not shown, it is apparent that a permanent register circuit may be associated with the register relays R in order that identification of the calling subscriber station may be stored until utilized by additional accounting circuitry in the central office, thereby to prevent release in response to operation of the reset relay.

It is to be understood that the above-described arrangements are merely illustrative of one embodiment of the principles of the invention. Numerous other arrangements may be devised by those skilled in the art without departing from the spirit and scope thereof.

What is claimed is:

1. In a telephone system, a line having a plurality of subscribers' stations connected thereto, a calling device at each of said stations, said devices having pulsing mechanisms to generate pulses possessing a distinctive ratio of make interval to break interval individual to each of said stations, means for receiving and repeating said pulses, means controlled by said pulse repeating means for differentiating between the ratios of said pulses from each of the various stations when calling, and means controlled by the output of said differentiating means for identifying a calling station.

2. In a telephone system, a line having a plurality of subscribers' stations connected thereto, a calling device at each of said stations, said devices having pulsing mechanisms to generate pulses possessing a distinctive ratio of make interval to break interval individual to each of said stations, means for receiving and repeating said pulses, means controlled by said pulse repeating means for differentiating between the ratios of said pulses from each of the various stations when calling, identifying means responsive to the operation of said differentiating means, means controlled by the output of said differentiating means and selectively controlled by the operation of said identifying means for registering the identification of the calling station.

3. In a telephone system, a line having a plurality of subscriber stations connected thereto, means at each of said subscriber stations for generating dial pulses having a distinctive ratio of make to break times for each of said stations, means connected to said line for distinguishing between said ratios, and indicating means actuated by the operation of said distinguishing means for identifying which of said stations had generated said pulses.

4. In a telephone system in accordance with claim 3, said distinguishing means including a pair of resistance-capacitance networks, the capacitances of one of said networks being charged during the make time of said dial pulses and the capacitances of the other of said networks being charged during the break time of said dial pulses.

5. In a telephone system in accordance with claim 4, said distinguishing means for further comprising a plurality of polar relays and means applying the voltages stored in said capacitances in series opposition to the windings of said polar relays, whereby at least certain of said polar relays are operated only if the capacitances of one of said networks have been charged to a higher voltage than the capacitances of the other of said networks.

6. In a telephone system, a line having a plurality of stations connected thereto, a calling device at each of said stations, said devices including pulsing mechanisms to transmit pulses having distinctive make intervals and break intervals for each individual station, means comprising relays for receiving and repeating said pulses, means comprising an arrangement of resistances and capacitances to differentiate between the ratios of the make and break intervals of the repeated pulses from the various stations, means responsive to the direction of flow of current resulting from the operation of said differentiating means for identifying the calling station, and means actuated by said differentiating means and controlled by the selective operation of said identifying means for registering the identification of the calling station.

7. In a telephone system, a line having a plurality of subscribers' stations connected thereto, a calling device at each of said stations, said devices each having a pulsing mechanism set to generate pulses having a distinctive form for each of said stations, means comprising a plurality of resistances and a plurality of capacitances arranged as circuit elements to differentiate between the pulses generated at each of the various stations when calling, means comprising a plurality of polar relays individually responsive to the direction of the flow of current resulting from the operation of said differentiating means to identify the calling station, and a plurality of relays selectively actuated by said differentiating means under the control of said selectively operated identifying means for recording the identity of the calling station.

8. In a telephone system, subscribers' lines including a party line having a plurality of stations associated therewith, a calling device at each of said stations, each of said devices including means to generate a distinctive pulse individual to one of said stations when calling and different from the pulses generated at each of the others of said stations when calling, means for receiving and repeating said distinctive pulses, means comprising resistor-capacitor networks having fixed time constants to measure the length of the pulses and the intervals between succeeding distinctive pulses in the same digital train, means for connecting said networks together, and means comprising a plurality of polar relays controlled by the direction of the flow of current resulting from the connection of said networks for identifying the calling station.

9. In a telephone system, a party line having a plurality of subscribers' stations connected thereto, a calling device at each of said stations, each of said devices being capable of producing a distinctive pulse when the station is calling, each of said pulses being distinguishable from the pulses of each of the other of said stations when calling by the relationship of the times of the make and break periods, means for receiving and repeating said pulses, means comprising a plurality of resistances and a plurality of capacitances in a network electrically charged during the make period and a plurality of resistances and a plurality of capacitances in a network electrically charged during the break period of said pulses to measure the duration of time of both the make phase and break phase of said pulses, identifying means comprising a plurality of polar relays responsive to the direction of flow of current from the operation of said measuring means for identifying the calling station, and means responsive to said identifying means for recording indicia identifying the calling station.

10. In a telephone system, subscribers' lines including a party line having a plurality of stations connected thereto, a calling device at each of said stations, each of said devices including a pulse transmitting mechanism operable when the station is calling to transmit pulses having a distinctive form distinguishable from the pulses of each of the other stations when calling by the ratio of the break time to the make time of the pulse, means for receiving and repeating said pulses, means comprising a plurality of resistances and a plurality of capacitances in a network electrically charged during the break time of said pulses, a first switching means controlled by said repeating means to interrupt charging of said network on cessation of the break time of said pulses, means comprising a plurality of resistances and capacitances arranged in a network electrically charged during the make time of said pulses, a second switching means responsive to said repeating means to interrupt charging of said last-mentioned network and for interconnecting said networks to differentiate between the make time and the break time of said pulses according to the amount of charge applied to elements of said network on cessation of the make time of said pulses, identifying means comprising a plurality of polar relays individually responsive to the direction of current flow resulting from the interconnection of said networks for identifying the calling station, and means comprising a plurality of relays responsive to the selective operation of said polar relays and actuated by said operated differentiating means for recording indicia identifying the calling station.

11. In a telephone system, a line having a plurality of subscriber stations connected thereto, a calling device at each of said stations, each of said devices including means to generate a distinctive pulse individual to each of said stations, means comprising a first resistor-capacitor network to measure the length of said pulses, said measuring means including means for charging said capacitors during the presence of said pulses, means comprising a second resistor-capacitor network to measure the intervals between succeeding pulses in the same pulse train, said last-mentioned measuring means including means for charging said capacitors during the interval between said pulses, means for connecting said resistor-capacitor networks together in series opposition after charging of said capacitors of said first and second networks, means including a polar relay for each of said stations operable on the flow of transient current between said capacitors, and means for locking up in its operated condition only the one polar relay which is associated with the subscriber station whose pulses had been timed by said networks.

12. In a telephone system in accordance with claim 11, said locking means including circuit means connecting said polar relays in series, said circuit means including an operate winding on each of said pollar relays and normally closed contacts of said polar relays, said circuit means being broken on operation of one of said polar relays by said transient current.

13. In a telephone system in accordance with claim 12, said polar relays being connected in said circuit means in sequence from said polar relay associated with said subscriber station having the longest dial pulse to said subscriber station having the shortest dial pulse, and further comprising register means associated with each of said polar relays and connected to said circuit means on operation of said polar relays by said transient current.

14. In a telephone system in accordance with claim 11, said locking means comprising a delay relay and circuit means controlled by said delay relay for applying current to said polar relays only after operation of said polar relays by said transient current.

References Cited in the file of this patent

UNITED STATES PATENTS

| | | |
|---|---|---|
| 2,228,113 | Hersey | Jan. 7, 1941 |
| 2,277,228 | Hecht | Mar. 24, 1942 |
| 2,283,610 | Mohr | May 19, 1942 |
| 2,524,773 | Deakin | Oct. 10, 1950 |
| 2,619,546 | Myers | Nov. 25, 1952 |